J. R. GAMMETER.
TIRE MANDREL AND METHOD OF PRODUCING THE SAME.
APPLICATION FILED NOV. 8, 1916.
1,353,158. Patented Sept. 21, 1920.
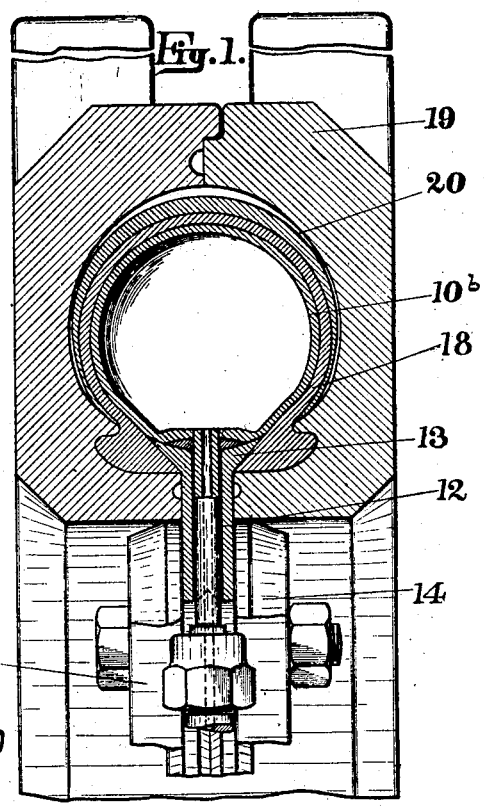
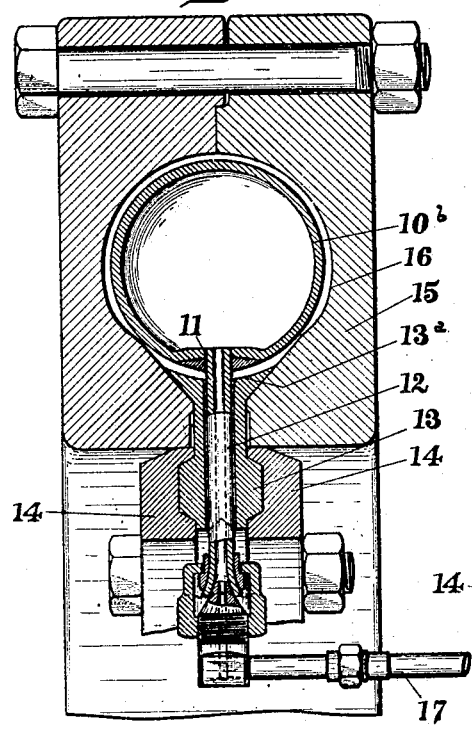
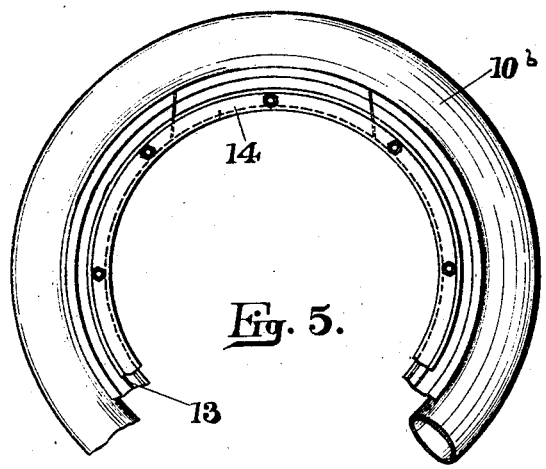
INVENTOR.
John R. Gammeter

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

TIRE-MANDREL AND METHOD OF PRODUCING THE SAME.

1,353,158.    Specification of Letters Patent.    Patented Sept. 21, 1920.

Application filed November 8, 1916. Serial No. 130,161.

*To all whom it may concern:*

Be it known that I, JOHN R. GAMMETER, a citizen of the United States, residing at Akron, in the county of Summit and State of Ohio, have invented certain new and useful Improvements in Tire-Mandrels and Methods of Producing the Same, of which the following is a specification.

This invention relates to expansible mandrels for the manufacture of hollow articles, and particularly pneumatic tire casings. Its object is to provide a core or mandrel of sufficient rigidity to enable the article to be formed thereover, but also capable of being stretched by fluid pressure to expand the formed article and press it against a mold or similar confining surface. Incidentally I aim to provide a mandrel which may be cheaply manufactured and may be readily removed from the tire casing or other hollow article, and the material of which can be used over again with but small waste and labor.

Specifically, I provide by means of my invention a hollow mandrel or tire-making core of a suitable soft metal such as lead or lead alloy, and I may expand or stretch said mandrel by fluid pressure in the process of making it, in order to give it the desired size and contour, and again, if desired, for the purpose of expanding an initially undersized tire casing or other vulcanizable article and causing the latter completely to fill the outer mold during vulcanization. My invention further consists in certain details hereinafter described and claimed.

Of the accompanying drawings,

Figure 1 is a cross-sectional view of a tire mold containing a tire casing and a lead mandrel embodying my invention.

Fig. 2 is a side elevation of a helical lead pipe from which the mandrel is made.

Fig. 3 is an elevation showing one turn of the helical pipe cut off and its ends ready to be joined to form a tubular annulus.

Fig. 4 is a sectional view showing the mandrel mold and a mandrel therein ready to be expanded and brought to proper size and shape by hydraulic pressure.

Fig. 5 represents a side elevation of the mandrel, including its segmental tongue.

In the drawings, Fig. 2, 10 is a coil or helix of pipe which may be produced from melted lead, preferably alloyed with a small percentage of tin, by extrusion through a die in the ordinary way, the diameter of the helix being approximately that which is desired for the unstretched mandrel, and the sectional diameter of the pipe being slightly less than that of the sizing and forming mold in which it is to be placed. If this helix is then sawed through, on one side along an axial plane, it will be divided into broken rings, each one of which is adapted to form an annular mandrel. One of these broken rings 10$^a$ is shown in Fig. 3, and in order to make it endless and fluid-tight its ends are soldered, welded, or otherwise suitably joined. A hole 11 is then made in the inner wall and a short section of pipe 12 is soldered in the hole.

To the inner circumference of the undersized hollow mandrel or mandrel-body 10$^b$, thus formed, is applied a mandrel-tongue ring 13 which, as indicated in Fig. 5, is divided circumferentially into segments which are held together by endless bolted clamping-rings 14. The outer periphery of ring 13 is slightly grooved or hollowed to form a concave seat 13$^a$ for the lead body of the mandrel, and the ring has a suitable aperture for the passage of pipe 12. This structure is then assembled between the halves of a mold 15 whose annular cavity 16 is of the desired shape and size for the mandrel body. The latter is expanded to fill this cavity by means of hydraulic pressure conducted through a pipe 17 which is coupled to the pipe-section 12. On removing the halves of the outer mold 15, the lead mandrel 10$^b$, together with the bolted segmental ring 13 to which it is attached, is then ready for forming a tire or tire carcass.

The tire casing 18 is built up in the usual way upon the mandrel, and when ready to be vulcanized it is placed therewith in a tire mold 19, preferably having a cavity 20 somewhat larger than the size of the raw tire in order to permit expansion of the tire within the mold for the purpose of consolidating the rubber with the other elements and placing the fabric or cord elements under an even tension. The stretching of the tire is performed by expanding the lead mandrel body 10ᵇ a second time by means of hydraulic pressure applied through the pipe section 12.

After the tire has been vulcanized in its expanded condition, the halves of the outer mold 19 are removed and the mandrel can then be removed from the tire by unbolting the clamping rings 14, taking apart the segmental ring 13 and pulling the lead core 10ᵇ out of the casing. As the core is thin walled and easily bent, it may be hooked out of the casing with a suitable tool. The lead can then be remelted and used over again.

Some of the advantages of my invention may be realized without expanding the core within the tire, the latter being made to the full size of the mold cavity, or cured in open steam by the wrapped-tread method, or otherwise cured. It will be further understood that various modifications may be made within the scope of or in the manner of use of the invention. For example, the lead mandrel could be expanded by gas from a suitable powder which might be placed in a small flask detachably connected to the pipe section 12, on the order of the apparatus described in my Patent No. 1,200,603.

The term lead, as used in the claims, includes a lead alloy which will remain solid at vulcanizing temperatures.

I claim:

1. A fluid-tight, hollow, stretchable, metallic mandrel.

2. A relatively thin-walled, fluid-tight, hollow, lead tire-making mandrel adapted to remain solid at vulcanizing temperatures.

3. A tire-making mandrel comprising a fluid-tight, hollow, lead annulus provided with an inlet for introducing an expanding fluid.

4. A tire-making mandrel comprising an inner rigid metallic ring adapted to fit between the halves of a tire mold, and an outer annular, hollow, lead mandrel-body thereon.

5. A tire-making mandrel comprising a rigid metallic tongue-ring divided circumferentially into segments, and an expansible, hollow, lead mandrel-body seated thereon.

6. A tire-making mandrel comprising an inner rigid metallic ring adapted to fit between the halves of a tire mold, and an outer, annular, hollow, lead mandrel-body thereon, provided with a fluid inlet-pipe extending through said ring.

In testimony whereof I have hereunto set my hand this 28 day of October, 1916.

JOHN R. GAMMETER.